United States Patent
Yiftachel et al.

(10) Patent No.: US 10,147,065 B1
(45) Date of Patent: Dec. 4, 2018

(54) DYNAMIC GENERATION OF RISK SCORE THRESHOLDS FOR OPTIMIZED CONFIGURATION OF POLICY RULES IN AN ADAPTIVE AUTHENTICATION SERVICE

(71) Applicant: EMC Corporation, Hopkinton, MA (US)

(72) Inventors: Peleg Yiftachel, Binyamina (IL); Alex Zaslavsky, Petach Tikva (IL); Marcelo Blatt, Modiin (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 425 days.

(21) Appl. No.: 14/672,419

(22) Filed: Mar. 30, 2015

(51) Int. Cl.
*G06Q 10/06* (2012.01)

(52) U.S. Cl.
CPC .................. *G06Q 10/0635* (2013.01)

(58) Field of Classification Search
CPC .................................................. G06Q 10/0635
See application file for complete search history.

(56) References Cited

U.S. PATENT DOCUMENTS

| | | | |
|---|---|---|---|
| 8,091,120 B2 | 1/2012 | Perrella et al. | |
| 8,621,586 B1 | 12/2013 | Peer et al. | |
| 8,646,060 B1 | 2/2014 | Ben Ayed | |
| 8,832,790 B1 | 9/2014 | Villa et al. | |
| 8,856,923 B1 | 10/2014 | Kolman et al. | |
| 8,875,267 B1 | 10/2014 | Kolman et al. | |
| 8,973,096 B1 | 3/2015 | Villa et al. | |
| 2008/0140576 A1* | 6/2008 | Lewis ................. | G06Q 10/0635 705/67 |
| 2008/0191007 A1* | 8/2008 | Keay ..................... | G06Q 40/02 235/379 |
| 2010/0287099 A1* | 11/2010 | Liu ......................... | G06Q 20/40 705/44 |
| 2010/0305993 A1* | 12/2010 | Fisher ................. | G06Q 10/0635 705/7.28 |
| 2011/0238510 A1* | 9/2011 | Rowen ............... | G06K 9/00187 705/16 |
| 2012/0266227 A1* | 10/2012 | Colson .................... | G06F 21/34 726/7 |
| 2012/0278126 A1* | 11/2012 | Morinaga ............... | G06Q 40/02 705/7.28 |

(Continued)

*Primary Examiner* — Sujay Koneru
(74) *Attorney, Agent, or Firm* — BainwoodHuang

(57) ABSTRACT

A system for optimized configuration of an adaptive authentication service is disclosed that automatically generates one or more risk score thresholds. The system generates a risk score threshold or thresholds for an upcoming time period such that the business damages estimated to occur during the upcoming time period are minimized. The business damages estimated to occur during the upcoming time period may include business damages resulting from false negative authentication determinations, which incorrectly indicate that a fraudulent authentication request is legitimate, and false positive authentication determinations, which incorrectly indicate that a legitimate authentication request is fraudulent, and may be offset by the beneficial value of the enhancement to an organization's reputation resulting from true positive authentication determinations, which correctly indicate that an authentication request is fraudulent.

14 Claims, 3 Drawing Sheets

(56) References Cited

U.S. PATENT DOCUMENTS

| | | | | |
|---|---|---|---|---|
| 2012/0278249 A1* | 11/2012 | Duggal | ................ | G06Q 40/08 |
| | | | | 705/325 |
| 2013/0024361 A1* | 1/2013 | Choudhuri | ............ | G06Q 40/02 |
| | | | | 705/39 |
| 2014/0172697 A1* | 6/2014 | Ward | ................ | G06Q 20/4016 |
| | | | | 705/39 |
| 2014/0304158 A1* | 10/2014 | Basu | ...................... | G06Q 20/02 |
| | | | | 705/44 |
| 2015/0227935 A1* | 8/2015 | Adjaoute | ............... | G06F 21/60 |
| | | | | 705/44 |
| 2016/0239771 A1* | 8/2016 | Gukal | ............... | G06Q 10/0635 |

\* cited by examiner

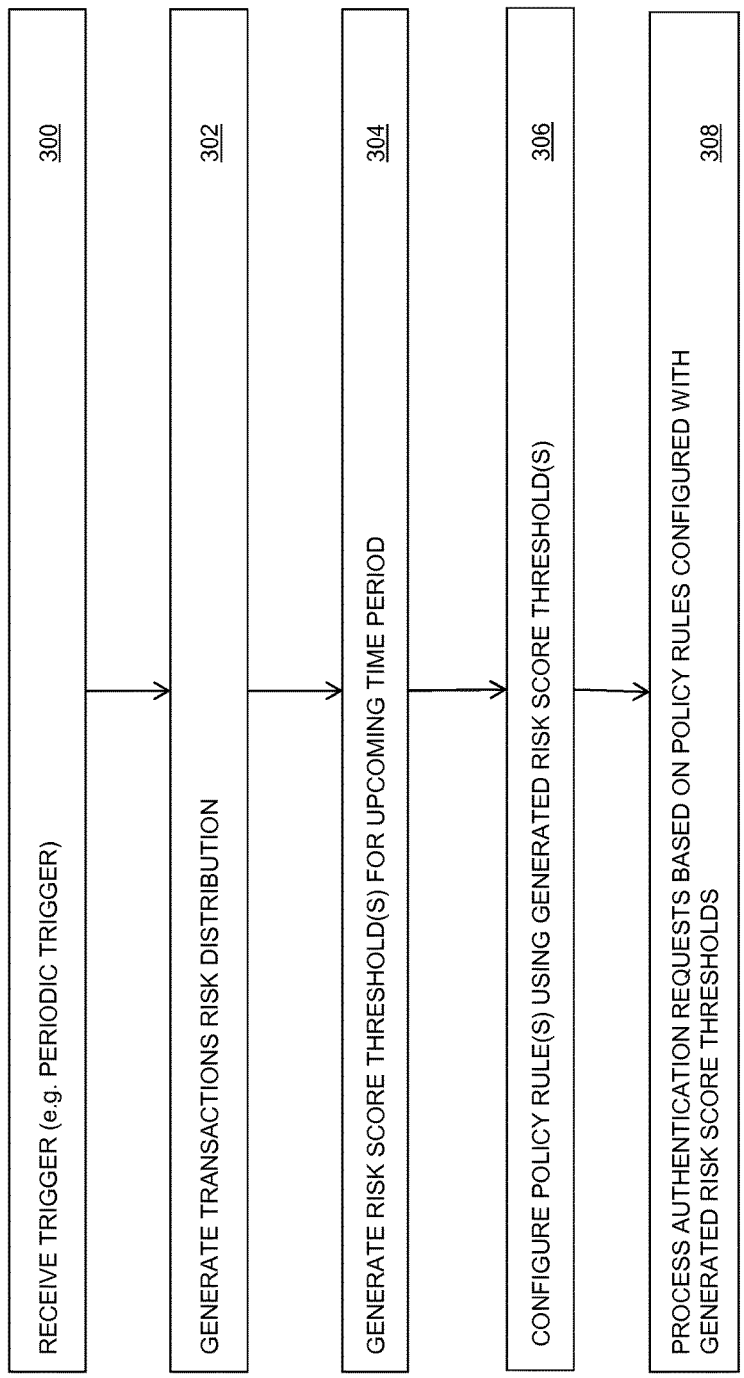

DYNAMIC GENERATION OF RISK SCORE THRESHOLDS FOR OPTIMIZED CONFIGURATION OF POLICY RULES IN AN ADAPTIVE AUTHENTICATION SERVICE

BACKGROUND

As it is generally known, authentication is the process of determining whether someone or something is, in fact, who or what it is declared to be. While basic authentication techniques (e.g. username/password combinations) are sufficient for many transactions, it is often desirable to impose more sophisticated processes on authentication requests that are deemed to be relatively high risk. In order to determine the specific type of authentication processing to be used to process individual authentication requests, adaptive authentication systems assign a risk score to each request. The risk score represents the risk that the request is fraudulent, i.e. the risk that the person or entity requesting authentication is an imposter. Based on a request's risk score, adaptive authentication systems select appropriate authentication processes to be applied to the request. Requests with relatively higher risk scores are processed using relatively more sophisticated authentication techniques that are more likely to ensure that a fraudulent request is not approved, while requests with lower risk scores are processed using more basic authentication processes.

SUMMARY

Previous adaptive authentication technologies have exhibited significant shortcomings with regard to setting appropriate risk score thresholds. These shortcomings reflect the basic tradeoffs between using different levels of authentication. While increasing the number of requests getting more thorough examination reduces the overall risk of fraud, it also increases the number of false alarms, and the use of costly resources. On the other hand, when less complex, lower cost authentication techniques are used more frequently, the result may be more fraudulent requests being approved.

Previous solutions have required users to create policy rules that effectively balance the inherent tradeoffs between using different levels of authentication. Specifically, previous systems have required users to create policy rules that control system behavior for each authentication request, based on the risk score for the request. The policy rules developed by the user have then determined whether specific authentication requests should be handled using basic or elevated levels of authentication. Previous systems have thus presented users with the very difficult task of determining appropriate policy rules for adaptive authentication. In particular, previous systems have required users to set risk thresholds that determine which specific requests get higher levels of authentication analysis. Unfortunately, the effects of selecting specific risk threshold values are often not directly evident to the user. As a consequence, users may set thresholds using default values, or use effectively arbitrary values, resulting in poorly configured systems. Resources may accordingly be used inefficiently, and performance may ultimately suffer.

In order to address the above described and other shortcomings of previous systems, a new system for business optimized configuration of an adaptive authentication service is disclosed. The disclosed system configures the adaptive authentication service by automatically generating one or more risk score thresholds. An optimization module generates a risk score threshold or thresholds for an upcoming time period. The risk score threshold is generated using a technique that minimizes the business damages estimated to occur during the upcoming time period. The minimization techniques used by the optimization module to generate the risk score threshold or thresholds for the upcoming time period use analyzed data collected into a transactions risk distribution representing the fraud probabilities (e.g. risk scores) associated with previous authentication requests. The transactions risk distribution may be generated from historical data describing previous authentication requests and their associated risk scores.

The business damages estimated to occur during the upcoming time period may include business damages resulting from false negative authentication determinations, which incorrectly indicate that a fraudulent authentication request is legitimate. Such false negative business damages estimated for a false negative determination may include the costs associated with compensating a customer for a theft occurring as a result of an imposter being allowed to access the customer's property or data.

The business damages estimated to occur during the upcoming time period may further include business damages resulting from false positive authentication determinations, which incorrectly indicate that a legitimate authentication request is fraudulent. Such false positive damages estimated for a false positive determination may, for example, include reputational damage incurred as a result of requiring a legitimate user to perform additional authentication steps, or incurred as a result of denying access to the legitimate user.

The business damages estimated to occur during the upcoming time period may further be offset by the value of the enhancement to an organization's reputation resulting from true positive authentication determinations, which correctly indicate that an authentication request is fraudulent. Such received value includes the reputational improvement accruing to an organization as a result of the organization being effective in protecting its customers from fraudulent attacks through true positive authentication determinations.

Additionally, the optimization module may consider an amount of resources available for performing additional levels of authentication when generating the risk score thresholds for the upcoming time period. For example, the amount of resources available for processing additional levels of authentication requests may include or consist of a number of work hours available from a team of human analysts that are used to handle the additional levels of authentication processing.

The disclosed system may be embodied to generate different risk thresholds for different ranges of transaction values, while minimizing overall resulting business costs across all transactions.

The risk score threshold or thresholds automatically generated by the disclosed system may be stored by the adaptive authentication system into one or more policy rules that are subsequently used to control which authentication requests are required to go through a higher level of authentication processing in the upcoming time period. For example, the risk score threshold generated by the disclosed system may be used to determine which authentication requests must go through an additional authentication step or steps following an initial authentication step. The additional authentication steps may include a second stage of authentication processing that includes answering one or more questions provided by a human analyst.

The disclosed system may be embodied or configured to dynamically generate risk score thresholds on a periodic basis. In such an embodiment, the disclosed system may generate optimized risk score thresholds at any specific rate, e.g. every day, every hour, every minute, etc.

The disclosed system provides significant advantages over previous adaptive authentication technologies. By automatically generating optimized risk score thresholds, the disclosed system reduces the amount of user involvement required to create policy rules, such as rules indicating which authentication requests should be required to go through higher levels of authentication. By optimizing risk score thresholds for the adaptive authentication system based on minimizing predicted business damages, the disclosed system ties risk score threshold generation directly to the business priorities of the user and/or organization. By periodically generating new risk score thresholds, the disclosed system generates risk score thresholds based on current historical data regarding previous authentication request processing. And by generating different risk score thresholds for different ranges of transaction values, the disclosed system may be embodied to apply available authentication resources with a bias towards ensuring that higher value transactions are properly authenticated, while still minimizing overall business costs in the adaptive authentication system across all transactions.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a flow chart showing steps performed during operation of an illustrative embodiment of the disclosed system.

DETAILED DESCRIPTION

Figure 1:
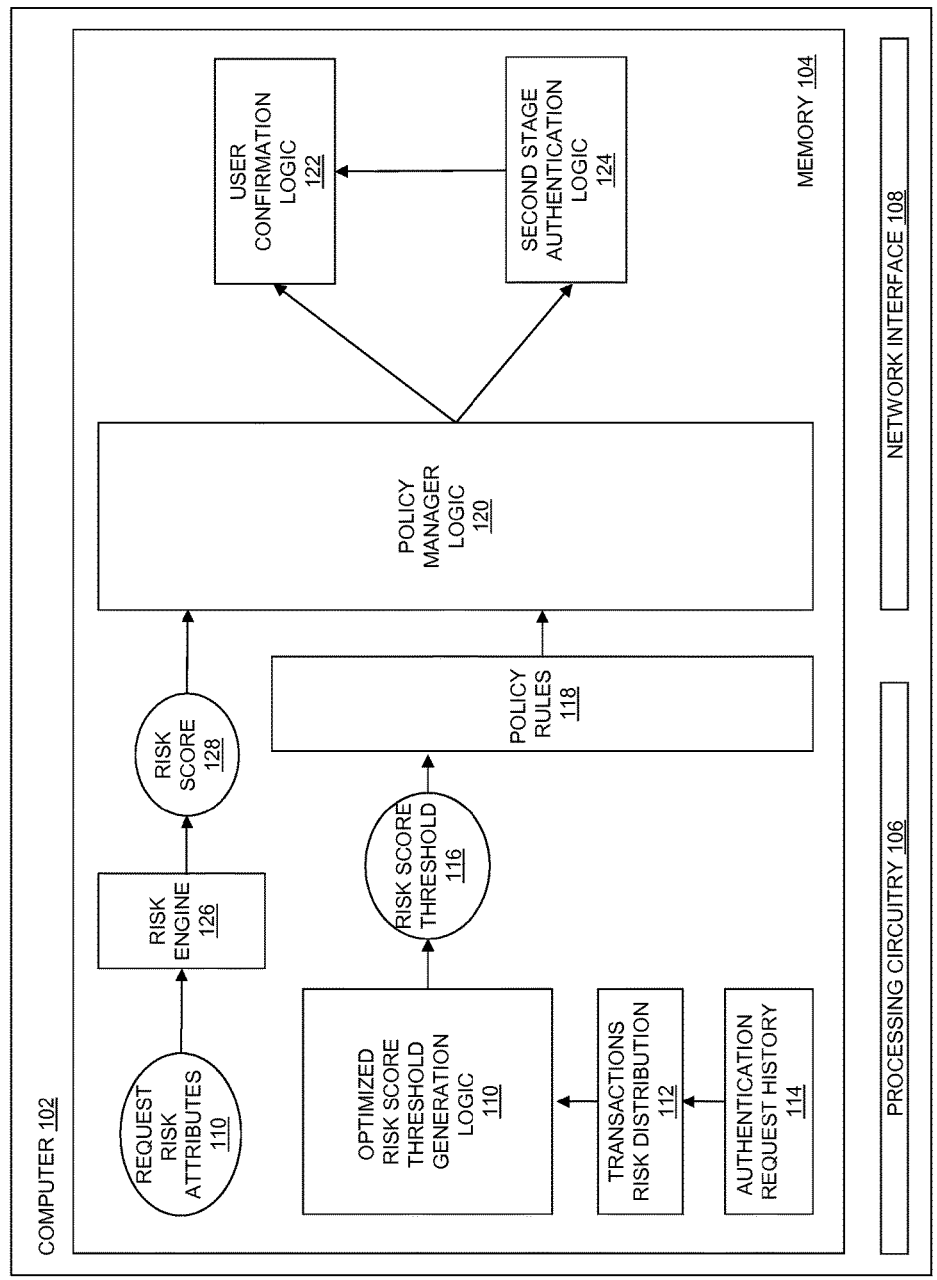
FIG. 1 is a block diagram showing components in an illustrative embodiment of the disclosed system.

As shown in FIG. 1, components in an illustrative embodiment of the disclosed system include a Computer 102 having a Memory 104, Processing Circuitry 106 and a Network Interface 108. Memory 104 may, for example, include or consist of any specific type of volatile or non-volatile semiconductor memory or the like that is operable to store programs (sequences of instructions) and/or data (e.g. program state information) for use in the Computer 102. Processing Circuitry 106 may, for example, include or consist of one or more microprocessors or the like. Network Interface 108 may, for example, include or consist of one or more network interface cards (NICs) or the like.

In the Computer 102 in the illustrative embodiment of FIG. 1, the Memory 104 stores program code for execution on the Processing Circuitry 106, which may be part of the adaptive authentication program code that provides authentication services to an organization, such as a bank or other business organization. For example, the authentication services provided by the adaptive authentication program code shown in FIG. 1 may include authentication services used by a bank to authenticate users (i.e. customers of the bank), when those users access their bank accounts through an online interface (e.g. a Web page or the like) provided by the bank.

In the embodiment of FIG. 1, the adaptive authentication program code for authenticating a user includes Optimized Risk Score Threshold Generation Logic 110, Policy Manager Logic 120, Risk Engine 126, User Confirmation Logic 122, and Second Stage Authentication Logic 124. The Memory 104 also stores data generated by and/or used during the execution of the program code for authenticating a user, including Request Risk Attributes 110, Risk Score 128, Authentication Request History 114, Transactions Risk Distribution 112, and Risk Score Threshold 116.

During operation of the components shown in FIG. 1, the disclosed system dynamically generates one or more risk score thresholds in order to configure one or more policy rules to perform business optimized configuration of the adaptive authentication service. For example, the Optimized Risk Score Threshold Generation Logic 110 operates to automatically generate one or more risk score thresholds, shown in FIG. 1 as Risk Score Threshold 116. In one embodiment, the Optimized Risk Score Threshold Generation Logic 110 generates Risk Score Threshold 116 for an upcoming time period, such that the value generated for Risk Score Threshold 116 is optimized to minimize an amount of business damages estimated to occur during the upcoming time period.

Optimized Risk Score Threshold Generation Logic 116 generates the Risk Score Threshold 116 for the upcoming time period using a historical transactions risk distribution, shown in FIG. 1 by Transactions Risk Distribution 112. Transactions Risk Distribution 112 stores the number of previously processed transactions (e.g. the number of authentication requests) associated with each probability of fraud (e.g. with each risk score value) across one or more preceding time periods. In one embodiment, Optimized Risk Score Threshold Generation Logic 110 generates Transactions Risk Distribution 112 from an automatically maintained log storing data describing previously processed authentication requests and their associated risk scores, shown in FIG. 1 by Authentication Request History 114.

Optimized Risk Score Threshold Generation Logic 110 uses Risk Score Threshold 116 to configure at least one policy rule of the adaptive authentication service, in order to provide a business optimized configuration of the adaptive authentication service provided by Computer 102. For example, Optimized Risk Score Threshold Generation Logic 110 generates Risk Score Threshold 116, and then stores Risk Score Threshold 116 into one or more policy rules in Policy Rules 118. The Policy Rules 118 are accessible to and used by Policy Manager Logic 120 during the upcoming time period to determine whether individual authentication requests must go through a second stage of authentication processing after successful completion of a first stage of authentication processing.

For example, Policy Manager Logic 120 processes each authentication request transaction based at least in part on Policy Rules 118, including any rules into which a previously generated value of Risk Score Threshold 116 has been stored, and on a current value of Risk Score 128 generated by Risk Engine 128 for the current request. For each authentication request that is processed, Risk Engine 126 generates Risk Score 128 based on Request Risk Attributes 110. Relatively higher values of Risk Score 128 are generated for authentication requests associated with risk attributes indicating higher risks of fraud. Risk Score 128 accordingly represents a probability of risk associated with a current authentication request. Risk Engine 126 inputs risk attributes associated with each authentication request, shown as Request Risk Attributes 110. Request Risk Attributes 110 may include any relevant measures, quantities, and/or values associated with an authentication request that may be used to determine a risk score indicating a probability that the user requesting access to a secure resource (e.g. a bank account) is an imposter. Examples of Risk Attributes 110 may include a device identifier of the device from which the user is communicating, a geographic location from which the user is communicating (e.g. as determined by Internet Protocol (IP) address to geographic location conversion), a day of the week during which the request is issued, a time of day at which the request is issued, a time duration since a previous authentication request was made for the same user, the internet service provider being used by the user to connect to the Internet, and/or any other type of risk attribute that may be compared with previous logins associated with the user (i.e. associated with a submitted username) for the current request. The disclosed system may generate a risk score for the authentication request based on how anomalous the values of Risk Attributes 110 are with respect to previous legitimate logins. For example, an authentication request may be considered to have a relatively higher probability of fraud if its risk attributes are inconsistent with previous legitimate authentication requests for the requesting user. The Risk Attributes 110 may also and/or alternatively be compared with attributes of previous malicious attacks/fraudulent actions. In this way the risk score for the authentication request may further be based on how similar the values of Risk Attributes 110 for the current authentication request are to known attack patterns.

The Risk Engine 126 generates a Risk Score 128 for each authentication request based on the Risk Attributes 110 for the request, and passes Risk Score 128 to Policy Manager Logic 120. Policy Manager Logic 120 then compares the value of Risk Score 128 for the current request to at least one risk score threshold previously stored in at least one of the policy rules in Policy Rules 118, in order to determine whether one or more additional levels of authentication are required for the request. For example, if a request is associated with a value of Risk Score 128 that is greater than a risk score threshold stored in one of Policy Rules 118, then Policy Manager Logic 120 will determine that the request requires an additional stage of authentication processing. Such additional authentication processing may, for example, include requiring the user to correctly answer one or more questions presented by a human analyst, e.g. verbally over the phone, in text through short message service (SMS) text messaging, etc. The additional authentication processing may, for example, be a second stage of authentication checking, required to be performed following an initial (or "first") authentication stage. For example, in an embodiment in which a first stage of authentication request processing requires a user to correctly enter their username and password in response to the authentication request, a second stage of authentication processing may require the user to correctly answer one or more questions from a human analyst (e.g. by the human analyst asking the user questions over the phone, via SMS, etc.).

As shown in FIG. 1, responsive to determinations by Policy Manager Logic 120, a second stage of authentication processing may, for example, be performed at least in part by Second Stage Authentication Logic 124. For example, Policy Manager Logic 120 may determine, responsive to comparing a value of Risk Score 128 for the request with one or more risk score thresholds in Policy Rules 118, that an authentication request, for which a correct username and password have already been received, must go through a second stage of authentication processing. In that case, in one embodiment, Policy Manager Logic 120 triggers Second Stage Authentication Logic 124 to send a message (e.g. electronic mail, SMS, etc.) to a human analyst. For example, the bank or other organization may employ a team of analysts whose job responsibilities include performing second stage authentication processing. The message sent by Second Stage Authentication Logic 124 may contain a phone number for the user, such as a phone number stored in a user/customer directory in association with an account associated with the previously received username. The Second Stage Authentication Logic 124 may alternatively automatically connect the human analyst, e.g. through a voice over internet protocol (VOIP) call or the like, to the phone number associated with the received username. As a result, the human analyst will either call the automatically provided phone number, or use the automatically established VOIP call, in order to ask the user one or more authentication challenge questions that must be answered correctly for the authentication request to result in an indication that the user is authenticated, and accordingly allow the user to access the secure resource (e.g. the user's bank account).

The user requesting access to the secure resource may be determined to be authentic as a result of either i) passing a first stage of authentication processing, without being required to perform a second stage of authentication processing, or ii) passing both the first stage and a required second stage of authentication processing. In the first case User Confirmation Logic 122 is triggered by Policy Manager Logic 120, and in the second case User Confirmation Logic 122 is triggered by Second Stage Authentication Logic 124, e.g. responsive to an indication provided by a human analyst (e.g. through a graphical user interface or the like displayed on a remote client computer system used by the human analyst) that the user has correctly answered the authentication challenge questions submitted to the user by the human analyst (e.g. by phone, SMS, etc.). In either case, User Confirmation Logic 122 operates by granting the user access to the requested secure resource (e.g. granting the user access to the user's bank account).

A determination by Policy Manager Logic 120 that an authentication request is associated with a sufficiently high probability of fraud to require a second stage of authentication processing is referred to as a "positive" determination. A determination by Policy Manager 120 that the probability of fraud associated with an authentication request is not sufficiently high to require a second stage of authentication processing is referred to as a "negative" determination.

The determination by Policy Manager 120 as to whether an authentication request must go through a second stage of authentication processing may be made after the user has successfully completed a first stage of authentication processing, e.g. by correctly entering their username and password.

Optimization Risk Score Threshold Generation Logic 110 generates Risk Score Threshold 116 based on probabilities that determinations made by Policy Manager 120 during the upcoming time period, as to whether authentication requests must go through a second stage of authentication, will fall into one of four classifications: false negative, false positive, true positive, and true negative.

In the case where a fraudulent user (i.e. an imposter) seeks to access another user's secure resource (e.g. another person's bank account), that user may also be referred to as a "fraudster". If a fraudster successfully completes the first stage of authentication processing (e.g. by correctly entering a username and password of the other user), but Policy Manager Logic 120 makes a negative determination (i.e. that the request has a risk score that is not high enough to justify a second stage of authentication processing), the fraudulent user will not be subjected to any further authentication processing, and is thus immediately (and mistakenly) allowed to access the secure resource. This type of determination by Policy Manager Logic 120 is classified by Optimized Risk Score Threshold Generation Logic 110 as a "false negative" determination.

In the case where a user requests access to their own secure resource (e.g. to their own bank account), that user may be referred to as a "legitimate" user. If a legitimate user successfully completes the first stage of authentication processing (e.g. by correctly entering their own username and password), but Policy Manager Logic 120 makes a positive determination (i.e. that the request has a risk score that is high enough to justify a second stage of authentication processing), the legitimate user will unnecessarily be subjected to a second stage of authentication processing (e.g. must take the time to correctly answer one or more questions from a human analyst before being granted access to their bank account). This type of determination by Policy Manager Logic 120 is classified by Optimized Risk Score Threshold Generation Logic 110 as a "false positive" determination.

In the case where a fraudster successfully completes the first stage of authentication processing (e.g. by correctly entering a username and password of another user), and Policy Manager Logic 120 makes a positive determination, the fraudster will appropriately be required to complete a second stage of authentication processing (which may be assumed have a very high or even perfect level of effectiveness in detecting fraudulent users and preventing them from accessing the secure resources of other users). This type of determination by Policy Manager Logic 120 is classified by Optimized Risk Score Threshold Generation Logic 110 as a "true positive" determination.

Finally, in the case where a legitimate user successfully completes the first stage of authentication processing (e.g. by correctly entering their own username and password), and the Policy Manager Logic 120 makes a negative determination (i.e. that the request has a risk score that is not sufficiently high to justify a second stage of authentication processing), the legitimate user is not subjected to a second stage of authentication processing, but is directly granted access to their secure resource (e.g. granted access to their bank account). This type of determination by Policy Manager Logic 120 is classified by Optimized Risk Score Threshold Generation Logic 110 as a "true negative" determination.

In a first embodiment, the Optimized Risk Score Threshold Generation Logic 110 generates values of Risk Score Threshold 116 that minimize business damages estimated to occur in the upcoming time period as a result of false negative determinations. The estimated false negative business damages for a specific value of Risk Score Threshold 116 are based on a probability of false negative determinations occurring during the upcoming time period using that value of Risk Score Threshold 116, and on an estimation of the amounts that must be compensated to the owners of the secure resources to which unauthorized access will be mistakenly granted (e.g. to customers of a bank whose money is stolen from their bank accounts). For example, the probability of a false negative determination being made for an authentication request occurring during the upcoming time period, based on the value of Risk Score Threshold 116, may be generated based on the contents of Transactions Risk Distribution 112, as further explained below with reference to FIG. 2.

The estimated amount that must be compensated to an owner of the secure resource to which unauthorized access is mistakenly granted through a false negative determination is equal to a withdrawal transaction amount (WTA), e.g. an amount of money requested to be withdrawn from a bank account by the user seeking authentication for the transaction. The WTA used to estimate false negative business damages for a false negative determination in the upcoming time period may, for example, be set as a constant value. In such an embodiment, the WTA is estimated to be the same for each false negative determination predicted to occur during the upcoming time period. Alternatively, different estimated WTAs may be used to generate different risk score thresholds for different ranges of WTA. In such an embodiment, the specific risk score threshold used to process an authentication request in the upcoming time period is determined based on the WTA range that contains the WTA for the request. Accordingly, based on estimated WTA, and as further described below, Optimized Risk Score Threshold Generation Logic 110 may operate to generate a value or values of Risk Score Threshold 128 that minimizes the estimated business damages for false negative determinations in the upcoming time period, including the costs associated with compensating customers for thefts occurring when imposters are allowed to access the customers' property (e.g. bank accounts).

In another embodiment, Optimized Risk Score Threshold Generation Logic 110 may generate values of Risk Score Threshold 116 that also minimize business damages estimated to occur in the upcoming time period as a result of false positive determinations. The estimated false positive business damages for a specific value of Risk Score Threshold 116 are based on a probability of false positive determinations occurring during the upcoming time period using that value of Risk Score Threshold 116, and on an estimation of the indirect damages resulting from false positive determinations. False positive business damages may include, for example, the indirect damages resulting from forcing a legitimate user (e.g. a customer of a bank) to undergo a time consuming second level of authentication processing in order to access their own property (e.g. their own bank account). For example, a probability of false positive determinations being made for authentication requests occurring during the upcoming time period using a specific value of Risk Score Threshold 116 may be generated based on the contents of Transactions Risk Distribution 112, as further explained below with reference to FIG. 2.

The estimated business damage resulting from false positive determinations may be referred to as "bothering damage" (BD), e.g. an estimation of the costs resulting from losing a customer due to the customer's displeasure with the bank's services after being unnecessarily forced to go through a second stage of authentication processing in order to legitimately access their own bank account. Optimized Risk Score Threshold Generation Logic 110 may operate to generate a value of Risk Score Threshold 128 that minimizes the estimated business damages for false positive determinations in the upcoming time period, including the costs associated with bothering customers with additional levels of authentication requirements when they are accessing their own customers' property.

In another embodiment, Optimized Risk Score Threshold Generation Logic 110 may generate values of Risk Score Threshold 116 based on the value of true positive determinations predicted to occur in the upcoming time period for specific values of Risk Score Threshold 116. The value of true positive determinations may include or consist of the value of a reputational improvement (RI) accruing to an organization (e.g. a bank) from true positive determinations predicted to occur in the upcoming time period. Such reputational improvement reflects the value to the organization of an increased reputation for effectively protecting its customers' secure data (e.g. bank accounts) from unauthorized access, as results from each true positive determination, since each true positive determination increases the likelihood or even guarantees that a fraudster will not be allowed to access another user's secure data.

Additionally, Optimized Risk Score Threshold Generation Logic 110 may generate values of Risk Score Threshold 116 based on an amount of resources available for performing additional levels of authentication when generating the risk score thresholds for the upcoming time period. For example, the amount of resources available for processing additional levels of authentication requests may include or consist of a total number of work hours available from a team of human analysts (i.e. an analyst team) that will handle additional levels of authentication processing during the upcoming time period.

Figure 2:
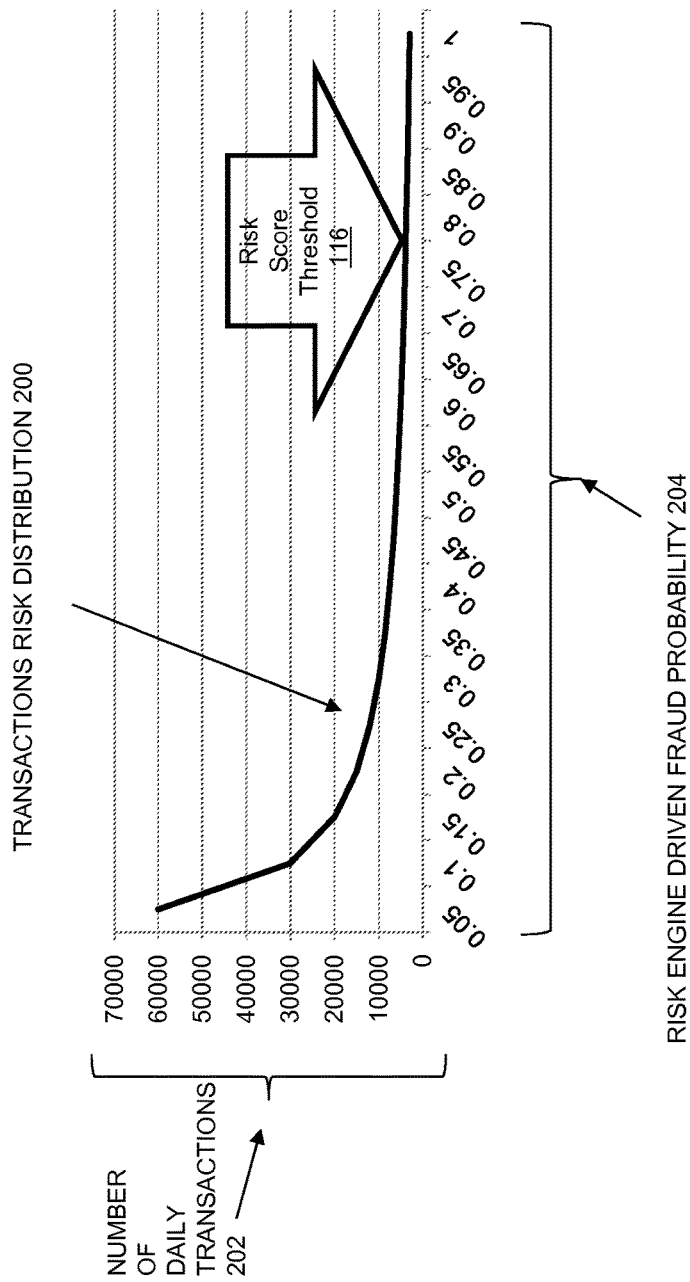
FIG. 2 is a graph showing a transactions risk distribution stored in a memory of an illustrative embodiment of the disclosed system.

FIG. 2 is a graph showing an example of a transactions risk distribution stored in a memory of an illustrative embodiment of the disclosed system. As shown in FIG. 2, a Transactions Risk Distribution 200 represents the Number of Daily Transactions 202 that occurred during at least one preceding time period for each of the Risk Engine Driven Fraud Probabilities 201. In the example of FIG. 2, Transactions Risk Distribution 200 stores the number of authentication requests processed during a preceding day for each of the Risk Engine Fraud Probabilities 204. The Transactions Risk Distribution 200 is an example of Transactions Risk Distribution 112 shown in FIG. 1.

In the example embodiment of FIG. 2, the Number of Daily Transactions 202 are authentication requests processed during a preceding day. However, while in the embodiment of FIG. 2, the preceding time period represented by Transactions Risk Distribution 200 is a day, the disclosed system is not so limited, and alternative embodiments and/or configurations may operate using any specific length of preceding and/or upcoming time periods, e.g. an hour, a minute, etc.

In the example embodiment of FIG. 2, the Risk Engine Driven Fraud Probabilities 204 may be any specific representation or indication of a probability of fraud between zero and one, i.e. a probability that an authentication request is a fraud. For example, the disclosed system may be embodied such that Risk Engine Driven Fraud Probabilities 204 are discrete risk scores generated by Risk Engine 126 or the like.

FIG. 2 also shows an example of Risk Score Threshold 116. When generating a value RT for Risk Score Threshold 116, the Optimized Risk Score Threshold Generation Logic 110 uses the following probabilities for the upcoming time period that are functions of the value RT selected for Risk Score Threshold 116:

i) a probability of false negative determinations: FN_Prob(RT),
ii) a probability of true positive determinations: TP_Prob(RT),
iii) a probability of true negative determinations: TN_Prob(RT), and
iv) a probability of false positive determinations: FP_Prob(RT).

The historical data in Transactions Risk Distribution 200 and the chosen value RT of Risk Score Threshold 116 drive a Challenge Rate CR(RT) that indicates the portion of transactions (e.g. authentication requests) within the upcoming time period that are predicted to be required to include a second level of authentication processing. Challenge Rate CR(RT) divides the probability domain (e.g. Risk Engine Driven Fraud Probabilities 204) into two subdomains:

1. CR(RT)—The portion of authentication requests for the upcoming time period that are predicted to require a second stage of authentication processing. This subdomain includes false positive and true positive determinations such that:

$CR(RT) = FP\_Prob + TP\_Prob$ (*)

2. 1-CR(RT)—The portion of authentication requests in the upcoming time period that are predicted to be authorized without requiring a second stage of authentication processing. This subdomain includes false negative and true negative determinations such that:

$1 - CR(RT) = FN\_Prob + TN\_Prob$ (**)

A function TransDist(x) based on Transactions Risk Distribution 200 returns the number of transactions (e.g. authentication requests) that were processed in the preceding time period having a risk engine driven fraud probability (e.g. risk score) of x. In this way TransDist(x) returns the number of transactions that are expected to be received during the upcoming time period having an associated risk score of x, based on the historical data in Transactions Risk Distribution 200.

The Transactions Risk Distribution 200, a value RT for Risk Score Threshold 116, and the resulting Challenge Rate CR, directly drive the generation by Optimized Risk Score Threshold Generation Logic 110 of probabilities for False Negative determinations (FN_Prob) and True Positive determinations (TP_Prob) in the upcoming time period as follows:

$$\text{FN\_Prob}(RT) = (1 - CR(RT)) \cdot \frac{\int_{o}^{RT} (TransDist(x) \cdot x)}{\int_{o}^{RT} TransDist(x)}$$

$$\text{TP\_Prob}(RT) = CR(RT) \cdot \frac{\int_{RT}^{1} (TransDist(x) \cdot x)}{\int_{RT}^{1} TransDist(x)}$$

According to (*) and (**) above, the Optimized Risk Score Threshold Generation Logic 110 may also generate the probabilities for True Negative determinations (TN_Prob) and False Positive determinations (FP_Prob) as follows:

$$\text{TN\_Prob}(RT) = (1 - CR(RT)) \cdot \left(1 - \frac{\int_{o}^{RT} (TransDist(x) \cdot x)}{\int_{o}^{RT} TransDist(x)}\right)$$

$$\text{FP\_Prob}(RT) = CR(RT) \cdot \left(1 - \frac{\int_{RT}^{1} (TransDist(x) \cdot x)}{\int_{RT}^{1} TransDist(x)}\right)$$

Based on the above probabilities, the Optimized Risk Score Threshold Generation Logic 110 minimizes the business damages estimated to occur in the upcoming time period (i.e. BusinessDamage(RT)) by selecting a value RT for Risk Score Threshold 116 that minimizes BusinessDamage(RT) in the upcoming time period based on the below model:

$$BusinessDamage(RT) = DT \cdot \begin{pmatrix} FN\_Prob(RT) \cdot WTA + \\ FP\_Prob(RT) \cdot BD - \\ TP\_Prob(RT) \cdot RI \end{pmatrix}$$

Such that $$DT \cdot CR(RT) \cdot WHPT \leq 9 \cdot TEAM\_SIZE$$

Where:
CR(RT) is the Challenge Rate, which as described above is a function of the generated risk score threshold value RT, and which indicates the portion of transactions (e.g. authentication requests) within the upcoming time period that are estimated to be required to include a second stage of authentication processing;
DT is the total number of transactions estimated for the upcoming time period (e.g. authentication requests estimated for the upcoming day, based on Transactions Risk Distribution 200);
WTA is a constant "Withdrawal Transaction Amount," e.g. an amount of money requested to be withdrawn from a bank account by the user seeking authentication that is the same for all authentication requests;
BD is "Bothering Damage", e.g. an estimation of the costs resulting from losing a customer due to the customer's displeasure with an organization's authentication services (e.g. a bank's authentication services) after being forced to go through a second stage of authentication processing in order to legitimately access their own secure resources (e.g. to access their own bank account);
RI is "Reputation Improvement," e.g. the value of the enhancement to an organization's reputation resulting from a true positive authentication determination, which correctly indicates that an authentication request is fraudulent;
WHPT is "Work Hours Per Transaction", e.g. the average amount of work hours of a human analyst used to process a second stage of authentication for an authentication request; and
TEAM SIZE is a constant indicating the number of employees in the human analyst team that handles second stage authentication, where the hours per day available per member of the analyst team is nine (9).

In an alternative embodiment, the disclosed system generates different risk score thresholds for different ranges of transaction values, while still minimizing overall resulting business costs across all transactions in the upcoming time period. In this alternative embodiment, the Optimized Risk Score Threshold Generation Logic 110 generates Risk Score Threshold 116 without using an identical withdrawal transaction amount (i.e. a constant WTA) for all transaction requests. Instead the Optimized Risk Score Threshold Generation Logic 110 generates a vector $RT_i$ of risk score thresholds for Risk Score Threshold 116, where each element of $RT_i$ stores a risk score threshold for a corresponding transaction amount range (i.e. range of WTAs for transactions received during the upcoming time period). The processing of each range of transaction amounts during the upcoming time period is controlled by a corresponding policy rule in Policy Rules 118. For example, in a configuration of an adaptive authentication system for a bank, the bank may allow withdrawal amounts up to $100,000. The adaptive authentication system may include 100 different policy rules (e.g. a vector $PolicyRules_i$), in which each rule controls the processing of withdrawal amounts within a corresponding $1000 range having an upper limit value of (i×$1000). Accordingly, policy rule $PolicyRules_1$ controls the processing of transactions with withdrawal amounts up to $1000, $PolicyRules_2$ controls the processing of transactions with withdrawal amounts greater than $1000 up to $2000, $PolicyRules_3$ controls the processing of transactions with withdrawal amounts greater than $2000 up to $3000, etc. The Optimized Risk Score Threshold Generation Logic 110 loads each of the individual risk score thresholds $RT_i$ into a corresponding one of the policy rules $PolicyRules_i$. The disclosed system selects the vector of risk score thresholds RT such that the overall amount of business damages estimated to occur during the upcoming time period is minimized across all ranges of transaction WTA. In such an embodiment, one example of the policy rules may have the following logic for processing individual transactions (e.g. authentication requests) during the upcoming time period:

IF Transaction Amount≤1000 && risk score>$RT_1$ OR
(1000<Transaction Amount≤2000) && risk score>$RT_2$ OR
(2000<Transaction Amount≤3000) && risk score>$RT_3$ OR
. . .
. . .
(99,000<Transaction Amount≤100,000 && risk score>$RT_{100}$ THEN Require a Second Stage of Authentication Processing (e.g. answering questions from a human analyst through operation of Second Stage of Authentication Logic 124 in FIG. 1)

In this alternative embodiment, the Optimized Risk Score Threshold Generation Logic 110 generates the vector RT by minimizing the business damages estimated to occur during the upcoming time period based on the following model in which each value of i represents a corresponding range of transaction WTA:

$$\underset{RT_1,\ldots,RT_{100}}{\text{Min}} \left\{ \sum_{i=1}^{100} BusinessDamage(i, RT_i) \right\}$$

Where for each value of i:

$$BusinessDamage(i, RT_i) = DT_i \cdot \begin{pmatrix} FN\_Prob(RT_i) \cdot i \cdot 1000 + \\ FP\_Prob(RT_i) \cdot BD - \\ TP\_Prob(RT_i) \cdot RI \end{pmatrix}$$

Such that $$WHPT \cdot \sum_{i=1}^{100} (DT_i \cdot CR_i(RT_i)) \leq 9 \cdot TEAM\_SIZE$$

Those skilled in the art will recognize that the disclosed system may further be embodied to include additional parameters. Specific additional parameters may be added as decision variables of the disclosed optimization model if they significantly influence the business damages estimated to occur in an upcoming time period. For example, the disclosed system may be embodied to generate the Risk Score Threshold 116 based in part on the country from which the transaction originated (i.e. the country in which the user seeking to access the secure resource is located). For example, if the residents of a certain country have significantly less tolerance for answering authentication questions from a human analyst, this increased sensitivity influences (i.e. increases) the "Bothering Damage" BD resulting from a False Positive determination. In order to have the disclosed system take such per-country values of BD into consideration when generating Risk Score Threshold 116, a "country" parameter may be used. Such additional parameters may be used by the disclosed system when generating the Risk Score Threshold 116 because the disclosed system is scalable in the sense of adding new parameters that significantly influence business damages. For example, in the embodiment described above in which a transaction amount parameter (e.g. WTA) is considered, the decision variables in the minimization model are represented by a vector of risk score thresholds RT, having values for each one of the amount ranges, as follows:

$RT_1$: 0<Amount≤1000
$RT_2$: 1000<Amount≤2000
.
.
.
$RT_{100}$: 99,000<Amount≤100,000

In an embodiment that includes an additional parameter for the country in which the user located, the disclosed system may be embodied to generate a vector of risk score thresholds RT for each country. Alternatively, the disclosed system may be embodied to operate by categorizing countries into groups, e.g. according to how sensitive the residents of the countries are to being required to answer authentication questions posed by human analysts. Such a grouping operation may, for example, result in all countries being assigned to one of a relatively small number of groups, e.g. to one of four groups. In such an embodiment, in which there are 100 ranges of transaction values, and 4 groups of countries, the disclosed system will operate to determine 400 risk score thresholds. If the country parameters are independent, the disclosed system can determine the 400 risk score thresholds through solving 4 different optimization models. Although each one of the optimizations performed has 100 decision variables (i.e. risk score thresholds), the optimization that is performed is still not overly resource intensive.

Moreover, in an embodiment that adds still another parameter for finding the optimal Risk Score Threshold 116, such as a user account type, Gold/Silver/Bronze, etc., the disclosed system will perform the optimization with 1200 decision variables (i.e. risk score thresholds), that can be handled by 12 independent optimization models.

As explained above, the disclosed system may be embodied or configured to dynamically generate risk score thresholds on a periodic basis. In such an embodiment, the disclosed system may generate the risk score thresholds at any specific rate, e.g. every day, every hour, every minute, etc. FIG. 3 is a flow chart showing steps performed periodically during operation of an illustrative embodiment of the disclosed system. The steps of FIG. 3 may, for example, be performed by one or more of the components shown in FIG. 1. At step 300, the disclosed system receives a trigger that causes the generation of Risk Score Threshold 116 (FIG. 1). The trigger received at step 300 may automatically occur every day, every hour, every minute, etc. At step 302, the disclosed system operates to generate a transactions risk distribution, such as Transactions Risk Distribution 112 shown in FIG. 1, and as further illustrated by the Transactions Risk Distribution 200 shown in FIG. 2. At step 304, the disclosed system generates one or more risk score thresholds for an upcoming time period (e.g. Risk Score Threshold 116). At step 306, the disclosed system configures one or more policy rules using the risk score thresholds generated at step 304. For example, the policy rules configured at step 306 may be the Policy Rules 118 shown in FIG. 1. Steps 302, 304 and 306 may, for example, by the Optimized Risk Score Threshold Generation Logic 110 shown in FIG. 1. At step 308, the disclosed system uses the policy rules configured at step 306 to process authentication requests until another trigger event is received at step 300 (e.g. a day, an hour, a minute, etc.). Step 308 may, for example, be performed by the Policy Manager Logic 120 shown in FIG. 1.

Those skilled in the art will recognize that the disclosed system is significantly more than merely the abstract idea of setting a risk score threshold. Instead, the disclosed system addresses various specific shortcomings arising in previous technical solutions, including shortcomings arising from setting risk score thresholds without visibility into estimated business damages predicted to occur within an upcoming time period. The disclosed system improves operation of the adaptive authentication system based on the optimized configuration of policy rules, such as rules indicating which authentication requests should be required to go through higher levels of authentication. By optimizing risk score thresholds for the adaptive authentication system based on predicted business damages, the disclosed system ties risk score threshold generation directly to the business priorities of the user and/or organization. By periodically generating new risk score thresholds, the disclosed system generates risk score thresholds based on current historical data regarding previous authentication request processing. And by generating different optimized risk thresholds for different ranges of transaction values, the disclosed system applies available authentication resources with a bias towards ensuring that higher value transactions are properly authenticated, while still minimizing overall business costs in the adaptive authentication system across all transactions.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. In particular, while the above description includes a client-server embodiment, the disclosed system is not limited to a client-server configuration, and may alternatively be embodied within a single computer system.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method for optimized configuration of an adaptive authentication service, comprising executing, on at least one processor, the steps of:

automatically maintaining, in a memory communicably coupled to the at least one processor, a log storing data describing previously processed authentication requests and risk scores associated with those previously processed authentication requests;

generating, using the log storing data describing the previously processed authentication requests and the risk scores associated with those previously processed authentication requests, a transactions risk distribution for an upcoming time period, wherein the transactions risk distribution for the upcoming time period comprises, for each one of a plurality of risk scores in a range of possible risk scores, a number of previous transactions for which that risk score was generated by the adaptive authentication service during a preceding time period, wherein each risk score indicates a probability that an associated authentication request is fraudulent, and wherein the transactions risk distribution further comprises, for each one of a plurality of probabilities, a predicted number of authentication requests received during the upcoming time period for which that probability will be generated as the probability that the authentication request is fraudulent;

generating, responsive to the transactions risk distribution for the upcoming time period, at least one risk score threshold for the upcoming time period that minimizes business damages estimated to occur during the upcoming time period, wherein the business damages estimated to occur during the upcoming time period include business damages resulting from false negative authentication determinations, wherein each of the false negative authentication determinations incorrectly indicates that a fraudulent authentication request is legitimate;

automatically configuring at least one policy rule of the adaptive authentication service with the risk score threshold to provide an optimized configuration of the adaptive authentication service, wherein configuring the at least one policy rule of the adaptive authentication service with the risk score threshold includes storing the risk score threshold in the policy rule;

in response to the risk score threshold in the policy rule, requiring authentication requests having associated risk scores greater than the risk score threshold to go through at least one additional stage of authentication processing after completing an initial stage of authentication processing;

wherein the business damages estimated to occur during the upcoming time period further include business damages resulting from false positive authentication determinations, wherein each of the false positive authentication determinations incorrectly indicates that a legitimate authentication request is fraudulent;

wherein the business damages estimated to occur during the upcoming time period are offset by a beneficial value resulting from true positive authentication determinations, wherein each true positive determination correctly indicates that an authentication request is fraudulent;

wherein the business damages resulting from false negative authentication determinations comprises a result of multiplying i) a probability of a false negative authentication determination occurring during the upcoming time period using the risk threshold, and ii) a predetermined withdrawal transaction amount that is the same for all authentication requests;

wherein the business damages resulting from false positive authentication determination comprises a result of multiplying i) a probability of a false positive authentication determination occurring during the upcoming time period using the risk threshold, and ii) a predetermined bothering damage amount that is an estimation of costs resulting from losing a customer who is forced to go through at least one additional stage of authentication processing after completing the initial stage of authentication processing;

wherein the initial stage of authentication processing comprises requiring a user requesting access to a secure resource to correctly enter their username and password; and wherein the at least one additional stage of authentication processing required to be performed after completion of the initial stage of authentication processing for requests having associated risk scores greater than the risk score threshold comprises requiring the user to correctly answer questions presented through text messaging.

2. The method of claim 1, further comprising:

wherein generating the risk score threshold for the upcoming time period that minimizes the business damages estimated to occur during the upcoming time period is further responsive to an amount of resources available for performing additional levels of authentication.

3. The method of claim 1, wherein generating the risk score threshold for the upcoming time period that minimizes the business damages estimated to occur during the upcoming time period generates a plurality of risk score thresholds, wherein each of the risk score thresholds is associated with a corresponding range of transaction values within a plurality of ranges of transaction values.

4. The method of claim 3, wherein configuring at least one policy rule of the adaptive authentication service with the risk score threshold includes storing each of the risk score thresholds into a corresponding one of a plurality of policy rules operable to control processing of transactions with associated values within the range of transaction values associated with the risk score threshold.

5. The method of claim 1, further comprising:

dynamically performing the steps of i) generating the transactions risk distribution for an upcoming time period, ii) generating the at least one risk score threshold for the upcoming time period, and iii) configuring the at least one policy rule of the adaptive authentication service on a periodic basis.

6. The method of claim 1, further comprising:

generating the transactions risk distribution for the upcoming time period from historical data describing previous authentication requests and their associated risk scores.

7. The method of claim 1, wherein for each one of the plurality of probabilities, the predicted number of authentication requests received during the upcoming time period for which that probability will be generated as the probability that the authentication request is fraudulent is equal to a number of authentication requests received during a preceding time period for which that probability was generated as the probability that the authentication request was fraudulent.

8. A system for optimized configuration of an adaptive authentication service, comprising:

at least one processor;

a memory having program code stored thereon, wherein the program code, when executed by the processor, causes the processor to:

automatically maintain, in the memory, a log storing data describing previously processed authentication requests and risk scores associated with those previously processed authentication requests;

generate, using the log storing data describing the previously processed authentication requests and the risk scores associated with those previously processed authentication requests, a transactions risk distribution for an upcoming time period, wherein the transactions risk distribution for the upcoming time period comprises, for each one of a plurality of risk scores in a range of possible risk scores, a number of previous transactions for which that risk score was generated by the adaptive authentication service during a preceding time period, wherein each risk score indicates a probability that an associated authentication request is fraudulent, and wherein the transactions risk distribution further comprises, for each one of a plurality of probabilities, a predicted number of authentication requests received during the upcoming time period for which that probability will be generated as the probability that the authentication request is fraudulent;

generate, responsive to the transactions risk distribution for the upcoming time period, at least one risk score threshold for the upcoming time period that minimizes business damages estimated to occur during the upcoming time period, wherein the business damages estimated to occur during the upcoming time period include business damages resulting from false negative authentication determinations, wherein each of the false negative authentication determinations incorrectly indicates that a fraudulent authentication request is legitimate;

automatically configure at least one policy rule of the adaptive authentication service with the risk score threshold to provide an optimized configuration of the adaptive authentication service, wherein configuring the at least one policy rule of the adaptive authentication service with the risk score threshold includes storing the risk score threshold in the policy rule;

in response to the risk score threshold in the policy rule, requiring authentication requests having associated risk scores greater than the risk score threshold to go through at least one additional stage of authentication processing after completing an initial stage of authentication processing;

wherein the business damages estimated to occur during the upcoming time period further include business damages resulting from false positive authentication determinations, wherein each of the false positive authentication determinations incorrectly indicates that a legitimate authentication request is fraudulent;

wherein the business damages estimated to occur during the upcoming time period are offset by a beneficial value resulting from true positive authentication determinations, wherein each true positive determination correctly indicates that an authentication request is fraudulent;

wherein the business damages resulting from false negative authentication determinations comprises a result of multiplying i) a probability of a false negative authentication determination occurring during the upcoming time period using the risk threshold, and ii) a predetermined withdrawal transaction amount that is the same for all authentication requests;

wherein the business damages resulting from false positive authentication determination comprises a result of multiplying i) a probability of a false positive authentication determination occurring during the upcoming time period using the risk threshold, and ii) a predetermined bothering damage amount that is an estimation of costs resulting from losing a customer who is forced to go through at least one additional stage of authentication processing after completing the initial stage of authentication processing;

wherein the initial stage of authentication processing comprises requiring a user requesting access to a secure resource to correctly enter their username and password; and wherein the at least one additional stage of authentication processing required to be performed after completion of the initial stage of authentication processing for requests having associated risk scores greater than the risk score threshold comprises requiring the user to correctly answer questions presented through text messaging.

9. The system of claim 8, further comprising:

wherein generating the risk score threshold for the upcoming time period that minimizes the business damages estimated to occur during the upcoming time period is further responsive to an amount of resources available for performing additional levels of authentication.

10. The system of claim 8, wherein the program code that, when executed by the processor, causes the processor to generate the risk score threshold for the upcoming time period that minimizes the business damages estimated to occur during the upcoming time period generates a plurality of risk score thresholds, wherein each of the risk score thresholds is associated with a corresponding range of transaction values within a plurality of ranges of transaction values.

11. The system of claim 10, wherein the program code that, when executed by the processor, causes the processor to configure at least one policy rule of the adaptive authentication service with the risk score threshold stores each one of the risk score thresholds into a corresponding one of a plurality of policy rules operable to control processing of transactions with associated values within the range of transaction values associated with the risk score threshold.

12. The system of claim 8, wherein the program code further includes:

program code that, when executed by the processor, causes the processor to dynamically perform the steps of i) generating the transactions risk distribution for an upcoming time period, ii) generating the at least one risk score threshold for the upcoming time period, and iii) configuring the at least one policy rule of the adaptive authentication service on a periodic basis.

13. The system of claim 8, wherein the program code further includes program that, when executed by the processor, causes the processor to:

generate the transactions risk distribution for the upcoming time period from historical data describing previous authentication requests and their associated risk scores.

14. A non-transitory computer readable medium for optimized configuration of an adaptive authentication service, comprising instructions stored thereon, that when executed on a processor, perform the steps of:

automatically maintaining, in a memory communicably coupled to the at least one processor, a log storing data describing previously processed authentication requests and risk scores associated with those previously processed authentication requests;

generating, using the log storing data describing the previously processed authentication requests and the risk scores associated with those previously processed authentication requests, a transactions risk distribution for an upcoming time period, wherein the transactions risk distribution for the upcoming time period comprises, for each one of a plurality of risk scores in a range of possible risk scores, a number of previous transactions for which that risk score was generated by the adaptive authentication service during a preceding time period, wherein each risk score indicates a probability that an associated authentication request is fraudulent, and wherein the transactions risk distribution further comprises, for each one of a plurality of probabilities, a predicted number of authentication requests received during the upcoming time period for which that probability will be generated as the probability that the authentication request is fraudulent;

generating, responsive to the transactions risk distribution for the upcoming time period, at least one risk score threshold for the upcoming time period that minimizes business damages estimated to occur during the upcoming time period, wherein the business damages estimated to occur during the upcoming time period include business damages resulting from false negative authentication determinations, wherein each of the false negative authentication determinations incorrectly indicates that a fraudulent authentication request is legitimate;

automatically configuring at least one policy rule of the adaptive authentication service with the risk score threshold to provide an optimized configuration of the adaptive authentication service, wherein configuring the at least one policy rule of the adaptive authentication service with the risk score threshold includes storing the risk score threshold in the policy rule;

in response to the risk score threshold in the policy rule, requiring authentication requests having associated risk scores greater than the risk score threshold to go through at least one additional stage of authentication processing after completing an initial stage of authentication processing;

wherein the business damages estimated to occur during the upcoming time period further include business damages resulting from false positive authentication determinations, wherein each of the false positive authentication determinations incorrectly indicates that a legitimate authentication request is fraudulent;

wherein the business damages estimated to occur during the upcoming time period are offset by a beneficial value resulting from true positive authentication determinations, wherein each true positive determination correctly indicates that an authentication request is fraudulent;

wherein the business damages resulting from false negative authentication determinations comprises a result of multiplying i) a probability of a false negative authentication determination occurring during the upcoming time period using the risk threshold, and ii) a predetermined withdrawal transaction amount that is the same for all authentication requests;

wherein the business damages resulting from false positive authentication determination comprises a result of multiplying i) a probability of a false positive authentication determination occurring during the upcoming time period using the risk threshold, and ii) a predetermined bothering damage amount that is an estimation of costs resulting from losing a customer who is forced to go through at least one additional stage of authentication processing after completing the initial stage of authentication processing;

wherein the initial stage of authentication processing comprises requiring a user requesting access to a secure resource to correctly enter their username and password; and wherein the at least one additional stage of authentication processing required to be performed after completion of the initial stage of authentication processing for requests having associated risk scores greater than the risk score threshold comprises requiring the user to correctly answer questions presented through text messaging.

* * * * *